May 7, 1929.                D. C. DE VINE                1,712,332
                     TURBINE WICKET GATE MOUNTING
                Filed April 10, 1922        3 Sheets-Sheet 3
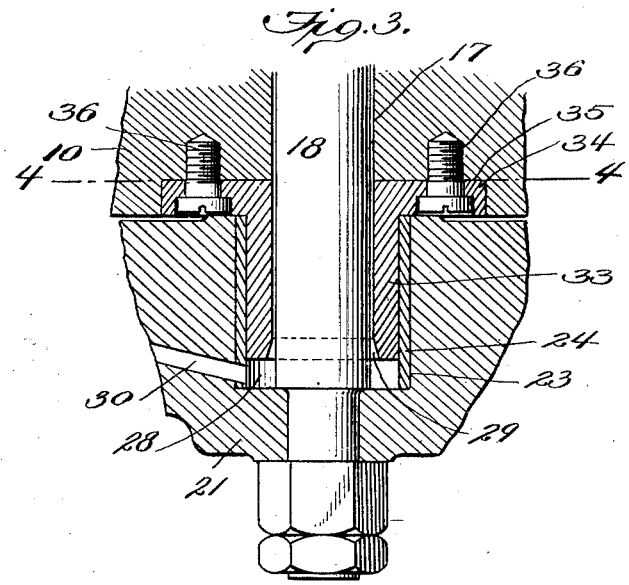
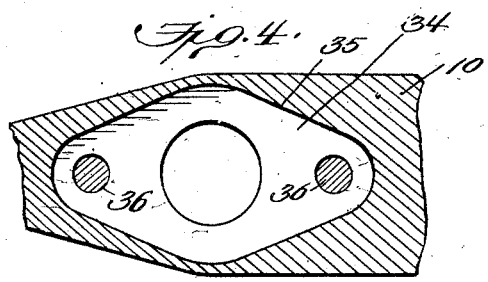
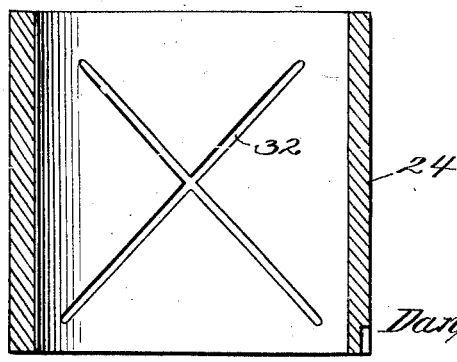
Inventor
Daniel C. DeVine
By
Attorney Patented May 7, 1929.

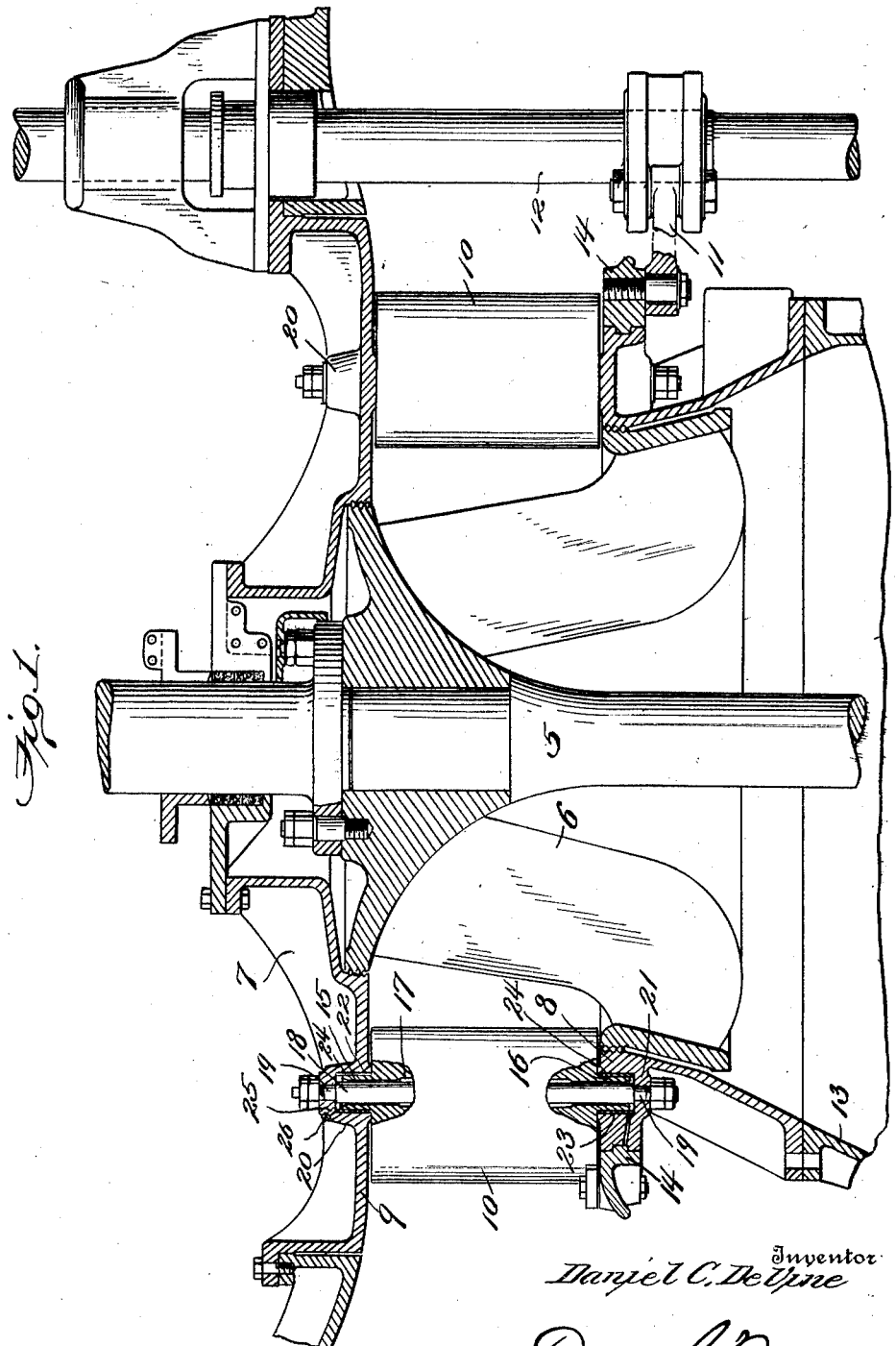

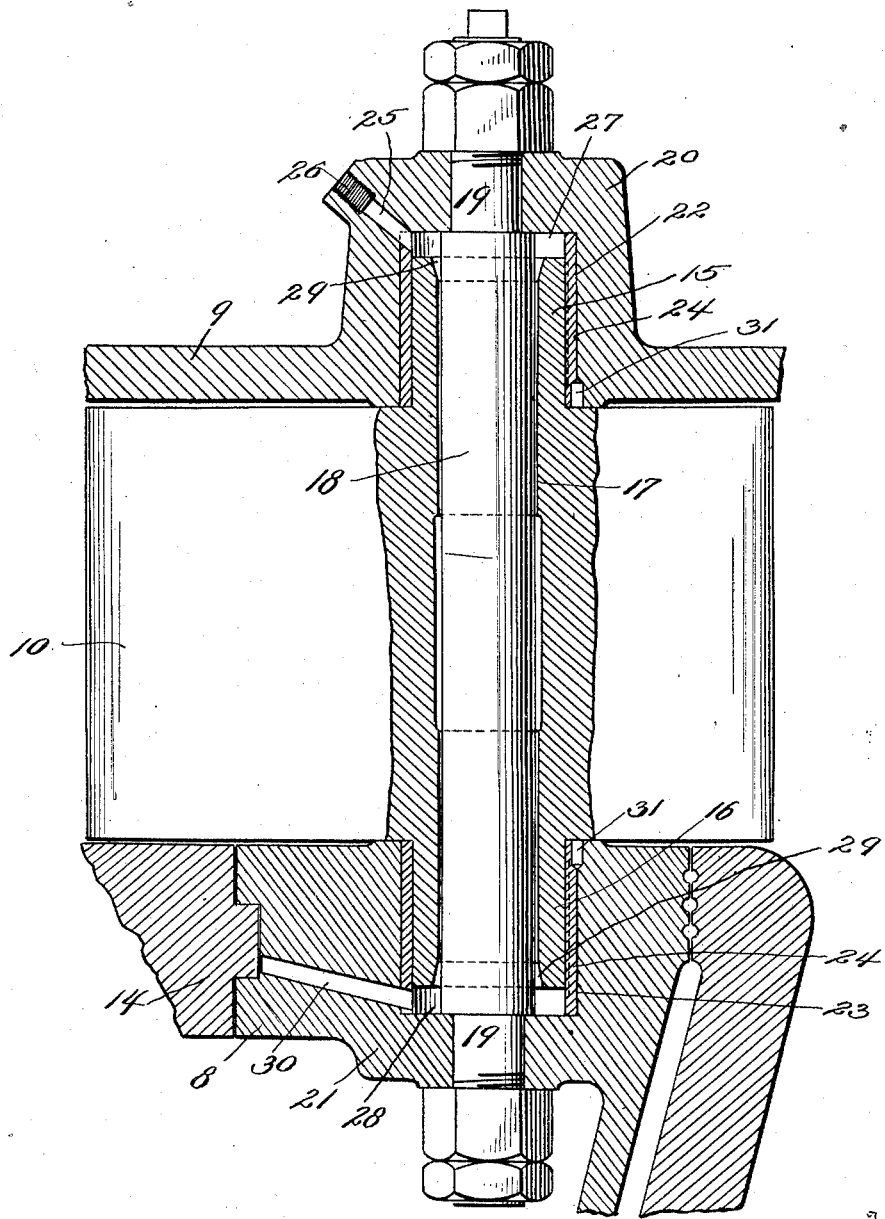

1,712,332

UNITED STATES PATENT OFFICE.

DANIEL C. DE VINE, OF YORK, PENNSYLVANIA, ASSIGNOR TO S. MORGAN SMITH COMPANY, OF YORK, PENNSYLVANIA, A CORPORATION OF PENNSYLVANIA.

TURBINE-WICKET-GATE MOUNTING.

Application filed April 10, 1922. Serial No. 551,243.

This invention relates to wicket gates for hydraulic turbines or water wheels, and particularly to novel means for swiveling gates of this type through the medium of trunnions operating in bearings mounted in the top and bottom plates forming part of the structure of hydraulic turbines.

In the ordinary form of wicket gate used on hydraulic turbines, the gate swings on a pin inserted therethrough. This pin is fastened to the bottom and top plates and supports the top plate from the bottom plate. The bearings in this well known form of gate mounting are necessarily small, and the lubrication is furnished by the water which operates the turbine. Consequently, these bearings are more or less rapidly worn, and when the water contains sand, grit or acid, the wear deterioration is very much more rapid. Furthermore, in the usual type of gate mounting, or wherein the gate swings on a gate pin, it sometimes happens that the engaged portions of the gate and gate pin become corroded to such a degree that the two parts are caused to adhere to such an extent that when the gate is adjusted or given an angular movement, it will at the same time move the pin to an equal angular degree, and this continual movement of the pin in the openings or holes therefor in the top and bottom plates will cause the pin to work loose and produce lost motion in the operation of the gate. Likewise, the wear of the pin in the openings therefor in the top and bottom plates will gradually increase the size of said openings and the gates will have a tendency to become loose, and lost motion thereof increases to a large extent, thereby permitting leakage through the gates when the turbine is in shut down position, or when the gates are closed. This leakage is not only detrimental from the standpoint of wasting water, but very frequently becomes serious enough, or the water may leak through in such quantities, as to operate the turbine runner at a more or less rapid speed when the gates are in closed position, with obvious material disadvantages, in view of the fact that under these leaking conditions the runner of the turbine cannot be stopped in its movement. Moreover, turbines having the usual form of wicket gate with a pin extending therethrough for mounting the same in the top and bottom plates do not fully provide for the necessary strength, for the reason that when the gates are closed, partly open, or entirely open, they are subject to a greater water pressure at the outside than at the inside, and as a consequence, there is a tendency to shear off each pin at the top and bottom portions of the gate.

To overcome the disadvantages of the usual form of gate pin mounting for wicket gates, is the object of the present invention, and in the improved structure the body of the gate at both the top and bottom is extended to form trunnions, which provide bearing means of materially greater sectional area than the ordinary gate pin, or, in other words, the improved bearing is very much larger than the usual pin type of bearing. A further advantage of the improved bearing is that the wearing disadvantages and corrosion of the gate and pins of the ordinary wicket gate bearing mounting are fully overcome, and a materially stronger and more durable wicket gate assemblage is provided, in view of the fact that there is no possibility of the improved bearing devices wearing openings in the parts provided therefor, with the result that the gates are uniformly held in true working position at all times and without the least lost motion. Moreover, the improved wicket gate mounting will furnish a more effective and advantageous support for the top plate, in view of the fact that the pin used in the improved bearing has but one function to perform, namely, to support the top plate, and is relieved of all direct stress of the wicket gate; while in the ordinary form of gate pin mounting, the pin not only has to support the top plate but also acts as a support and bearing for the gate.

The invention in the present instance consists in the preferred construction and arrangement of the several parts which will be more fully hereinafter described and claimed.

In the drawings:

Fig. 1 is a transverse vertical section through the upper portion of a turbine and particularly showing the runner and gates with the gates broken away to illustrate more clearly the improved bearing and mode of assembling the gates with the top and bottom plates;

Fig. 2 is a transverse vertical section on an enlarged scale with the gate broken away and showing the improved gate mounting together with the lubricating means therefor;

Fig. 3 is a detail transverse section on an enlarged scale, showing a slight modification in the mode of applying the trunnions to the gates;

Fig. 4 is a horizontal section on the line 4—4, Fig. 3; and

Fig. 5 is a detail transverse vertical section through one of the bushings, showing the oil grooves formed therein.

The numeral 5 designates a turbine shaft of well known form having a runner 6 mounted thereon disposed in a casing 7, which will have the usual accessories in a complete structure and provided with lower and upper plates 8 and 9 between which the gates 10 are adjustably mounted and operated by links or connections 11 attached to a gate operating rod or shaft 12 which projects upwardly above the plane of the turbine any suitable distance for actuation and as may be desired. The turbine casing 7 will also have a draft tube attached thereto, as at 13, and which is shown broken away in the present instance. In Fig. 1 the gate operating links or connections 11 are shown attached to a gate operating ring 14 associated with the lower portions of the gates for uniformly opening and closing the gates, as will be understood. Instead of associating these gate operating devices with the lower portions of the gates, they may be applied to the top portions of the gates in the same manner and involve well known constructions. The features thus far described do not of themselves form part of the invention, as they are commonly employed in certain other turbine installations but they are preferably used in carrying out the invention.

The invention resides primarily in the swivel or mounting means for the gates 10 and consists of upper and lower hollow trunnions 15 and 16, which as shown by Figs. 1 and 2 are cast integral with the upper and lower ends of each gate and in alinement with a pin bore or seat 17 extending vertically through the gate. The gate 10 and the trunnions 15 and 16 may have the bores therethrough formed in any suitable manner, all of the bores being of greater diameter than a pin 18 vertically inserted through the trunnions and the bore 17 and having nuts applied to upper and lower reduced extremities 19 thereof which seat respectively against the outer sides of upper and lower bosses 20 and 21, the shoulders on the pin adjacent its reduced extremities seating against the inner sides of the respective bosses, so that each pin may act as a combined tension and compression member to prevent relative movement of the opposed gate plates either toward or from one another. The upper trunnion 15 extends into a socket or seat 22 formed through the top plate 9 and continued into the boss 20, and the lower trunnion 16 likewise extends into a socket or seat 23 formed in the lower plate 8 above and in line with the boss 21. The sockets 22 and 23 are of greater diameter than the trunnions 15 and 16, respectively, extending thereinto, and between these trunnions and the side walls of the sockets, suitable metal bushings 24 are inserted. The trunnions 15 and 16 are of less length than their respective sockets 22 and 23, so that the trunnions do not extend through either of the gate plates, and the ends of the trunnions are relieved from bearing on the end walls of the said sockets and leakage of water outwardly along the trunnions is avoided without requiring the use of stuffing boxes. The bushings 24, however, extend the full length of the sockets, or provide linings for the latter which materially add to the strength and durability of the swivel mountings at the upper and lower ends of each gate and also operate to maintain the gates in true upright positions. The swivel mountings comprising essentially the trunnions 15 and 16 at the opposite ends of each gate are enclosed and excluded from direct water contact, especially in view of the hard grease lubrication hereinafter explained or do not depend upon water lubrication to ease the movement thereof, and moreover, it will be seen that the pin 18 is wholly enclosed and shielded from water contact and in the present instance serves merely to support the upper plate 9 from the lower plate 8 and as a support on which the gate is permitted to freely operate during its opening and closing adjustments. As a consequence, there is no wear on the pin 18 nor on the openings in the bosses 20 and 21 through which the opposite ends of the pin extend, and this particular mounting of the pin 18 also advantageously provides for maintenance of the gate in true upright position and insures accurate closure of the same without the least liability of leakage, and moreover, the strain of the water pressure on the outer side of the gate is relieved from the pin and is imposed upon bearing elements or the trunnions 15 and 16 and the metal bushings 24, and hence, great resistance is given the gate to overcome any wear on the bearing parts incident to the water pressure on the outer side thereof. Moreover, there is no liability of the trunnions 15 and 16 adhering to the pin 18, particularly in view of the fact that both bearing organizations at the upper and lower end of each gate are thoroughly lubricated through the medium of a supply duct 25 extending diagonally through the top portion of the boss 20 normally connected to a grease pressure device at 26. The duct 25 opens into a space 27 above the upper end of the trunnion 15, and as the bore 17 for the pin 18 is of larger diameter than the pin, the lubricant is permitted to pass down around the pin through the said bore to a lower space 28 between the lower end of the lower trunnion 16 and the end wall of the lower socket 23. The upper and lower extremities of the bore 17 are enlarged or flared, as at 29, to respectively give free ingress and egress of the lubricant to and from the bore 17. From the lower space 28 the lubricant is also adapted to pass outwardly through an upwardly inclined duct 30 to the gate ring 14 for conveniently lubricating the latter and rendering its operation easier by reducing the friction thereof. Each of the metal bushings 24 is held against rotation by a key pin 31 inserted therein, as clearly shown in Fig. 2, and the interior of each bushing is formed with communicating crossed lubricating grooves 32, as shown by Fig. 5, these grooves extending such distance vertically over the interior of the bushings as to be in part exposed, respectively, in the spaces 27 and 28 for taking up and distributing the lubricant around the trunnions 15 and 16. The preferred lubricant will be in the form of grease, which is forced into the duct 25 and from the latter into the space 27 and then works around the several parts open to lubrication, as hereinbefore specified. It will be seen that by introducing lubricating material in the manner explained, the improved swivel mounting of the gate will permit a very easy operation of the gate during its adjustment and the leakage of water into the improved bearing will be resisted.

Instead of forming the trunnions 15 and 16 integral with the upper and lower ends of the gate, the trunnion shown by Figs. 3 and 4 may be used, consisting of a tubular bearing member 33 having a head flange 34 of the form shown in Fig. 4 and flushly fitted in a recess 35 of the same shape and secured in place by screws or other analogous fastenings 36. This additional showing of the application of the trunnions to the gate ends is intended to demonstrate that the same function may be obtained by forming the trunnions either integral with or separate from and secured to the gates.

The metal bushings 24 may be renewed when found necessary and the general dimensions and proportions of the several parts may also be modified at will, and in the form of the device embodying separate trunnions 33 which are attached by the screws 36, these separable trunnions may be replaced at any time found necessary. Under ordinary wearing conditions, however, replacement of the separable trunnions or substitution of new gates having the itnegral trunnions 15 and 16 shown by Figs. 1 and 2 will be necessary only at very long intervals, in view of the fact that the wear on the associated parts of each of these swivel bearings is reduced to a minimum and all of the parts are primarily of such dimensions as to compensate for any unusual wearing contingencies. The improved swivel bearing for the gate embodying the features of the present invention will also render the assemblage of the gates between the top and bottom plates reliably true, with superiority in operation and certainty in opening and closing movements, and other advantages hereinbefore specified.

What is claimed as new is:

1. The combination with a casing of a hydraulic turbine including lower and upper plates, of a wicket gate having supporting trunnions projecting from the upper and lower ends thereof and rotatably seated in the lower and upper plates, the gate and trunnions having alined bores therethrough, a pin loosely inserted through the gate and trunnion bores and fixed to the plates, and gate operating means connected to the gate independently of said trunnions.

2. A hydraulic turbine casing comprising lower and upper plates, a wicket gate having upper and lower supporting trunnions rotatably seated in the plates, a pin loosely extending through the trunnions and gate and fixed at its opposite extremities to the plates, and a link connected to the outer end of the gate for operating it.

3. A hydraulic turbine casing comprising upper and lower plates having sockets therein, a wicket gate having upper and lower trunnions movably extending into the said sockets, renewable bushings mounted in the sockets around the trunnions, and a pin loosely extending through the gate and trunnions and seating adjacent its opposite extremities against the plates to prevent relative movement of said plates toward one another.

4. A hydraulic turbine casing comprising upper and lower plates having sockets therein, a wicket gate having upper and lower projecting trunnions rotatably extending into the sockets and of less length than the depth of the sockets, and a pin loosely extending through the trunnions and the gate and fixed at opposite extremities to the plates to prevent relative movement of said plates either toward or from one another.

5. A hydraulic turbine casing comprising lower and upper plates having sockets therein, a wicket gate having projecting trunnions at the upper and lower ends thereof extending into the sockets, said trunnions being of less length than the depth of the sockets, bushings fitted in the sockets and having the trunnions disposed therein, and a pin loosely extending through the trunnions and gate and having means adjacent its opposite extremities abutting against the inner and outer sides of the plates.

6. A hydraulic turbine casing comprising lower and upper plates with sockets therein, a wicket gate having upper and lower trunnions rotatably mounted in the sockets, the trunnions and gate having alined bores therethrough, and a pin extending through the bores of the trunnions and gate and having shoulders seating against the inner sides of the plates and means adjacent its opposite extremities abutting against the outer sides of the plates, the bores of the gate and trunnions being greater in diameter than the diameter of the pin.

7. A hydraulic turbine casing comprising lower and upper plates having sockets therein, wicket gates disposed between the said plates and having lower and upper trunnions extending into the sockets, each gate and its trunnions having alined bores therethrough, and a pin loosely inserted through the bores of each gate and its trunnions and fixed at opposite extremities to the said plates, the one socket of each gate mounting being provided with a lubricant supply duct communicating therewith and the remaining socket fed with the lubricant through the bores of each gate and its trunnions.

8. A hydraulic turbine casing comprising lower and upper plates having sockets therein, the upper socket being provided with a lubricant supply duct, a wicket gate mounted between the plates and having upper and lower trunnions projecting and rotatable in the sockets and of less length than the depth of said sockets to form spaces above and below the respective trunnions, the trunnions and gate having alined bores extending therethrough, renewable bushings mounted in the sockets and enclosing and engaged by the trunnions and having lubricating grooves at their inner sides, and a pin extending through the bores of the gate and trunnions and fixed at its opposite extremities to the plates, the pin being of less diameter than the said bores to permit the lubricant to pass from the space above the upper trunnions downwardly through the bores to the space below the lower trunnion.

9. A hydraulic turbine casing comprising lower and upper plates having sockets therein, the upper socket having a lubricant supply duct communicating therewith and the lower socket having a distributing lubricant duct extending outwardly therefrom, wicket gates mounted between the plates and each having upper and lower trunnions extending into the sockets, bushings mounted in the sockets around the trunnions and having inner lubricating grooves, spaces being formed in the sockets above the upper trunnion and below the lower trunnion with which the supply duct and distributing duct respectively communicate, a pin passing loosely through each gate and its trunnions, each gate and its trunnions having alined bores of greater diameter than the pin passing therethrough to serve as communicating means between the upper and lower passages for movement of the lubricant from the one passage to the other and also to permit each gate to be rotated without engaging its pin, and a gate operating ring connected to the gates and lubricated through the medium of the distributing ducts which extend thereto.

10. A hydraulic turbine comprising opposed gate plates, a wicket gate disposed between said plates and having trunnions projecting from its ends and bearing in the respective plates, the gate and trunnions having alined bores therethrough, and a combined tension and compression member extending through the gate and trunnions and having means thereon abutting against the inner and outer sides of said plates.

11. A hydraulic turbine casing having opposed gate plates, a wicket gate having trunnions at opposite ends movably extending into sockets in said plates and terminating within said sockets, and a pin loosely extending through the trunnions and gate and sockets and secured to said plates and enclosed and shielded from water contact.

12. A hydraulic turbine casing having opposed members, a wicket gate having end bearing devices projecting into said members, and a pin supporting the one member in relation to the other against movement in a direction either toward or from it and loosely passing through and enclosed by the gate and its bearing devices.

In testimony whereof I have hereunto set my hand.

DANIEL C. DE VINE.